(12) United States Patent
Nakamura et al.

(10) Patent No.: US 9,377,776 B2
(45) Date of Patent: Jun. 28, 2016

(54) NUMERICAL CONTROL APPARATUS AND PRODUCTION SYSTEM

(75) Inventors: Naoki Nakamura, Tokyo (JP); Tomonori Sato, Tokyo (JP); Shinya Nishino, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 704 days.

(21) Appl. No.: 13/259,831

(22) PCT Filed: Jan. 22, 2010

(86) PCT No.: PCT/JP2010/050829
§ 371 (c)(1),
(2), (4) Date: Sep. 23, 2011

(87) PCT Pub. No.: WO2010/140390
PCT Pub. Date: Dec. 9, 2010

(65) Prior Publication Data
US 2012/0016514 A1    Jan. 19, 2012

(30) Foreign Application Priority Data
Jun. 3, 2009    (JP) .................................. 2009-134053

(51) Int. Cl.
*G05B 19/19* (2006.01)
*G05B 19/4103* (2006.01)

(52) U.S. Cl.
CPC .. *G05B 19/4103* (2013.01); *G05B 2219/34101* (2013.01); *G05B 2219/34104* (2013.01)

(58) Field of Classification Search
USPC .......................................... 700/184, 186–190
See application file for complete search history.

(56) References Cited

U.S. PATENT DOCUMENTS 3,297,924 A * 1/1967 Kamm .......................... 318/573
3,703,327 A * 11/1972 Pomella et al. ............... 318/571
(Continued)

FOREIGN PATENT DOCUMENTS

JP    4 174006    6/1992
JP    10-49215 A    2/1998
(Continued)

OTHER PUBLICATIONS

Ho, C.-C., "Feature-Based Process Planning and Automatic Numerical Control Part Programming", Dec. 1997, The University of Utah, Department of Computer Science.*
(Continued)

*Primary Examiner* — Mohammad Ali
*Assistant Examiner* — Kelvin Booker
(74) *Attorney, Agent, or Firm* — Oblon, McClelland, Maier & Neustadt, L.L.P.

(57) ABSTRACT

A numerical control apparatus includes a machining-program reading unit that reads a command issued from a machining program, a command-path storing unit that stores a pre-compression command path in a pre-compression command path buffer, a compression processing unit that creates new one post-compression command path connecting start points and end points of a continuous plurality of pre-compression command paths, a movement-data creating unit that creates tool movement data necessary for correcting the post-compression command path to a tool movement path and interpolating the tool movement path, and an interpolation processing unit that interpolates the tool movement path and calculates a tool position using both the pre-compression command path stored by the command-path creating unit and the tool movement data of the tool movement path after compression created by the movement-data creating unit.

16 Claims, 10 Drawing Sheets

(56) References Cited

U.S. PATENT DOCUMENTS

| | | | | |
|---|---|---|---|---|
| 3,860,805 A * | 1/1975 | Strukel | 708/270 |
| 3,969,615 A * | 7/1976 | Bowers et al. | 700/189 |
| 4,034,192 A * | 7/1977 | Kishi et al. | 700/189 |
| 4,061,907 A * | 12/1977 | Okamoto et al. | 708/270 |
| 4,214,192 A * | 7/1980 | Bromer et al. | 318/573 |
| 4,276,792 A * | 7/1981 | Strobel | 82/1.11 |
| 4,458,326 A * | 7/1984 | Kinoshita | 708/290 |
| 4,468,688 A * | 8/1984 | Gabriel et al. | 348/580 |
| 4,493,032 A * | 1/1985 | Johnson | 700/189 |
| 5,028,855 A * | 7/1991 | Distler et al. | 700/187 |
| 5,105,694 A * | 4/1992 | Smith et al. | 82/138 |
| 5,197,014 A * | 3/1993 | Seki et al. | 700/189 |
| 5,204,599 A * | 4/1993 | Hohn | 318/571 |
| 5,223,777 A * | 6/1993 | Werner et al. | 318/569 |
| 5,287,049 A * | 2/1994 | Olomski et al. | 318/568.1 |
| 5,351,087 A * | 9/1994 | Christopher | H04N 3/223 348/441 |
| 5,434,793 A * | 7/1995 | Korner | 700/189 |
| 5,471,395 A * | 11/1995 | Brien | 700/186 |
| 5,473,542 A * | 12/1995 | Olomski et al. | 700/189 |
| 5,493,193 A * | 2/1996 | Seki et al. | 318/573 |
| 5,563,484 A * | 10/1996 | Otsuki et al. | 318/568.15 |
| 5,682,319 A * | 10/1997 | Boland et al. | 700/189 |
| 5,815,399 A * | 9/1998 | Fujibayashi et al. | 700/186 |
| 5,930,142 A * | 7/1999 | Schleicher et al. | 700/56 |
| 6,223,095 B1 * | 4/2001 | Yamazaki et al. | 700/187 |
| 6,553,143 B2 * | 4/2003 | Miyake et al. | 382/236 |
| 6,563,535 B1 * | 5/2003 | Anderson | H04N 1/0044 348/231.2 |
| 6,580,959 B1 * | 6/2003 | Mazumder | 700/121 |
| 6,771,825 B1 * | 8/2004 | Hurst, Jr. | 382/236 |
| 6,774,598 B1 * | 8/2004 | Kohler et al. | 318/600 |
| 6,922,606 B1 * | 7/2005 | Yutkowitz | 700/187 |
| 7,006,688 B2 * | 2/2006 | Zaklika et al. | 382/165 |
| 7,424,162 B2 * | 9/2008 | Kitamura | H04N 19/176 375/E7.093 |
| 8,442,805 B2 * | 5/2013 | Reem et al. | 703/2 |
| 8,687,697 B2 * | 4/2014 | Srinivasan et al. | 375/240.16 |
| 2001/0021880 A1 * | 9/2001 | Kato et al. | 700/160 |
| 2001/0021881 A1 * | 9/2001 | Iriguchi et al. | 700/160 |
| 2001/0024098 A1 * | 9/2001 | Takahashi et al. | 318/569 |
| 2002/0002420 A1 * | 1/2002 | Hirai et al. | 700/187 |
| 2002/0102027 A1 * | 8/2002 | Miyake et al. | 382/239 |
| 2002/0135335 A1 * | 9/2002 | Grohmann et al. | 318/569 |
| 2003/0012437 A1 * | 1/2003 | Zaklika et al. | 382/169 |
| 2003/0033029 A1 * | 2/2003 | Kohler et al. | 700/13 |
| 2003/0120376 A1 * | 6/2003 | Shibata et al. | 700/189 |
| 2003/0200005 A1 * | 10/2003 | Hirai et al. | 700/187 |
| 2004/0181307 A1 * | 9/2004 | Hirai et al. | 700/194 |
| 2005/0035734 A1 * | 2/2005 | Haunerdinger et al. | 318/574 |
| 2005/0090930 A1 * | 4/2005 | Otsuki et al. | 700/178 |
| 2005/0228533 A1 * | 10/2005 | Hioki et al. | 700/159 |
| 2007/0046677 A1 * | 3/2007 | Hong et al. | 345/442 |
| 2007/0250206 A1 * | 10/2007 | Otsuki et al. | 700/189 |
| 2007/0293962 A1 * | 12/2007 | Kimura et al. | 700/97 |
| 2008/0193026 A1 * | 8/2008 | Horie et al. | 382/238 |
| 2008/0269933 A1 * | 10/2008 | Barbir | 700/98 |
| 2009/0100096 A1 * | 4/2009 | Erlichson | H04L 67/02 |
| 2009/0157218 A1 * | 6/2009 | Otsuki et al. | 700/188 |
| 2009/0228138 A1 * | 9/2009 | Otsuki et al. | 700/187 |
| 2009/0248203 A1 * | 10/2009 | Nakamura et al. | 700/251 |
| 2009/0279111 A1 * | 11/2009 | Bala et al. | 358/1.9 |
| 2010/0036647 A1 * | 2/2010 | Reem et al. | 703/2 |
| 2011/0093114 A1 * | 4/2011 | Tsai | 700/191 |
| 2011/0166693 A1 * | 7/2011 | Nishibashi | 700/187 |
| 2011/0238204 A1 * | 9/2011 | Ono et al. | 700/189 |
| 2012/0046782 A1 * | 2/2012 | Schulze et al. | 700/187 |
| 2012/0271446 A1 * | 10/2012 | Sato et al. | 700/108 |

FOREIGN PATENT DOCUMENTS

| | | |
|---|---|---|
| JP | 2000-148217 A | 5/2000 |
| JP | 3456524 | 10/2003 |
| JP | 3459155 | 10/2003 |
| JP | 2005 122332 | 5/2005 |
| JP | 2007 293409 | 11/2007 |
| JP | 2008 003756 | 1/2008 |

OTHER PUBLICATIONS

Li, P. and Guo, R., "Research on Quaternion-Quintic Spherical Bezier Spline Interpolation Algorithm for 5-axis Machining", 2009, Proceedings of 2009 4$^{th}$ International Conference on Computer Science and Education.*

Luo, L.; Hu, J.; Liu, F. and Yao, Z., "A Revised B Spline Interpolation Algorithm of CNC Machining", Jun. 2009, Proceedings of the 2009 IEEE International Conference on Information and Automation.*

Mei, Z.; Wei, Y.; Chun-Ming, Y.; DingKang, W. and Xiao-Shan, G., "Curve Fitting and Optimal Interpolation on CNC Machines Based on Quadratic B-Splines", Jan. 2010, vol. 53, No. 1, pp. 1-18.*

Yamakawa, M.; Bu, S. and Shiina, T., "Robust Strain Estimation Using Adaptive Dynamic Grid Interpolation Model", 2008, Proceedings of the 2008 IEEE International Ultrasonics Symposium.*

Zhang, J. and Knoll, A., "From Numerical Interpolation to Constructing Intelligent Behaviours", Aug. 1999, University of Bielefeld, Faculty of Technology.*

Ebertein, W., "Modern CNC Control Systems for High Speed Machining", May 1999, Modern Machine Shop.*

Pang, J., "Mutiresolution Analysis as an Approach for Tool Path Planning in NC Machining", 2003, Retrospective Theses and Dissertations, Iowa State University.*

Siemens, "Milling with SINUMERIK, 5-axis machining, manual", May 2009, Siemens Corporation.*

Yin, Z., "Rough and Finish Tool-Path Generation for NC Machining of Freedom Surfaces Based on a Multiresolution Method", Mar. 2003, Computer-Aided Design, vol. 36, pp. 1231-1239.*

Zhang, J. and Knoll, A., "From Numerical Interpolation to Constructing Intelligent Behaviours", 1997.*

Mei, Z.; Wei, Y.; Chun-Ming, Y.; DingKang, W. and Xiao-Shan, G., "Curve Fitting and Optimal Interpolation on CNC Machines Based on Quadratic B-Splines", Aug. 2008, Science China, vol. 53, No. 1, pp. 1-18.*

International Search Report Issued Feb. 16, 2010 in PCT/JP10/050829 Filed Jan. 22, 2010.

Office Action issued on Aug. 12, 2013 in the corresponding Taiwanese Patent Application No. 099129623 (with English Translation).

* cited by examiner

○ : START AND END POINTS OF PRE-COMPRESSION COMMAND PATH
■ : START AND END POINTS OF POST-COMPRESSION COMMAND PATH

FIG.9

```
G90 G01 X3.0 Y3.0 Z3.0 F1000; (TOOL MOVEMENT DATA)
    X1.0 Y1.0 Z1.0; (COMMAND PATH)
    X2.0 Y2.0 Z2.0; (COMMAND PATH)
G01 X6.0 Y6.0 Z6.0; (TOOL MOVEMENT DATA)
    X3.0 Y3.0 Z3.0; (COMMAND PATH)
    X4.0 Y4.0 Z4.0; (COMMAND PATH)
    X5.0 Y5.0 Z5.0; (COMMAND PATH)
     .
     .
     .
```

FIG.11

```
G90 G01 X3.0 Y3.0 Z3.0 F1000; (TOOL MOVEMENT DATA)
   U5.0 V6.0 W7.0; (PATH CORRECTION VALUE)
   X1.0 Y1.0 Z1.0; (COMMAND PATH)
   X2.0 Y2.0 Z2.0; (COMMAND PATH)
G01 X6.0 Y6.0 Z6.0; (TOOL MOVEMENT DATA)
   U5.0 V6.0 W7.0; (PATH CORRECTION VALUE)
   X3.0 Y3.0 Z3.0; (COMMAND PATH)
   X4.0 Y4.0 Z4.0; (COMMAND PATH)
   X5.0 Y5.0 Z5.0; (COMMAND PATH)
      .
      .
      .
```

NUMERICAL CONTROL APPARATUS AND PRODUCTION SYSTEM

FIELD

The present invention relates to a numerical control apparatus and a production system that subject a machine tool to numerical control (NC), and, more particularly to a numerical control apparatus and a production system that control movement of a tool with respect to a workpiece according to a machining program including a continuous plurality of command paths.

BACKGROUND

When a machine tool mounted with a numerical control apparatus is caused to perform machining of a three-dimensional shape, the machining could be performed according to a machining program in which free-form surfaces are approximated in a continuous plurality of command paths. The machining program could be manually created if a shape to be machined is a simple shape. However, in the case of a three-dimensional shape including a free-form surface, in general, the three-dimensional shape is created by a CAM (Computer Aided Manufacturing) on an external apparatus different from the numerical control apparatus.

When a machining program is created using the CAM, to represent a free-form surface as accurately as possible, it is necessary to reduce the length of one command path (hereinafter referred to as path length). However, the number of command paths that can be processed in a fixed time is limited by a data processing ability of the numerical control apparatus. Therefore, when the path length is reduced, a distance that the tool can move in the fixed time, i.e., feeding speed of the tool is limited.

Therefore, in the numerical control apparatus in the past, the path length is increased by replacing a continuous plurality of command paths in the same straight line section with one command path (compressing the command paths) and high-speed machining is performed (e.g., Patent Document 1).

CITATION LIST

Patent Literature

Patent Literature 1: Japanese Patent No. 3459155

SUMMARY

Technical Problem

However, according to the technique in the past, an allowable error range is provided in determining whether command paths are present in the same straight line section. Therefore, when a continuous plurality of command paths are replaced with one command path, there is a problem in that a path error due to the compression occurs and machining accuracy is deteriorated.

According to the related art, when a tolerance used in determining whether command paths are present in the same straight line section is reduced to reduce the path error due to the compression, there is a problem in that a high-speed processing effect by the compression decreases and it is difficult to perform high-speed machining.

The present invention has been devised in view of the above and it is an object of the present invention to obtain a numerical control apparatus and a production system that can realize an increase in speed of machining without deteriorating machining accuracy even when a machining program including a plurality of command paths having short path length is used.

Solution to Problem

In order to solve the above problem and in order to attain the above object, a numerical control apparatus of the present invention, includes: a compression processing unit that creates a post-compression command path in which start points and end points of a continuous plurality of pre-compression command paths are connected; a movement-data creating unit that corrects, based on path correction/operation data for the post-compression command path, the post-compression command path to a tool movement path and creates tool movement data used for interpolating the tool movement path; and an interpolation processing unit that interpolates, based on the tool movement data created by the movement-data creating unit, a tool movement path obtained by correcting the pre-compression command path and calculates a tool position.

Advantageous Effects of Invention

According to the present invention, there is an effect that it is possible to realize an increase in speed of machining without deteriorating machining accuracy even when a machining program including a plurality of command paths having short path length is used.

BRIEF DESCRIPTION OF DRAWINGS

FIG. 9 is an example of a storage form of both of pre-compression command paths and tool movement data in the second embodiment of the present invention.

FIG. 11 is an example of a storage form of all of pre-compression command paths, a post-compression command path, and path correction/operation data according to the third embodiment of the present invention.

DESCRIPTION OF EMBODIMENTS

Embodiments of a numerical control apparatus and a production system according to the present invention are explained in detail below with reference to the drawings. The present invention is not limited by the embodiments.

First Embodiment

Figure 1:
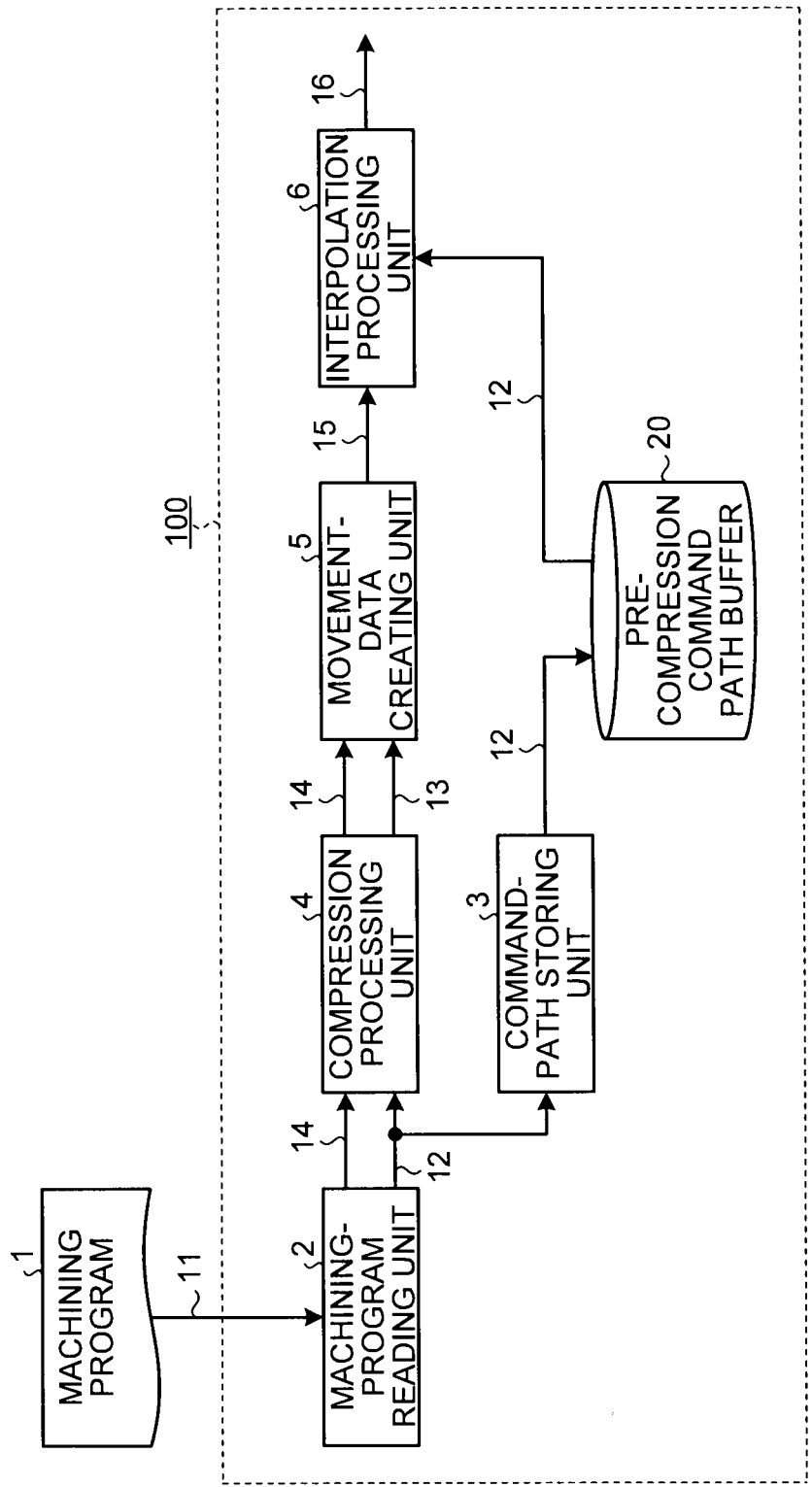
FIG. 1 is a block diagram of a schematic configuration of a numerical control apparatus according to a first embodiment of the present invention.

FIG. 1 is a block diagram of a schematic configuration of a first embodiment of the numerical control apparatus according to the present invention. In FIG. 1, a numerical control apparatus 100 can subject movement of a tool with respect to a workpiece to numerical control according to a machining program including a continuous plurality of command paths.

The numerical control apparatus 100 includes a machining-program reading unit 2 that reads a command 11 issued from the machining program 1, a command-path storing unit 3 that stores a pre-compression command path 12 read by the machining-program reading unit 2 in a pre-compression command path buffer 20, a compression processing unit 4 that creates new one post-compression command path 13 connecting start points and end points of a continuous plurality of pre-compression command paths 12, a movement-data creating unit 5 that creates tool movement data 15 necessary for correcting the post-compression command path 13 to a tool movement path and interpolating the tool movement path, and an interpolation processing unit 6 that interpolates the tool movement path and calculates a tool position 16.

When the command 11 issued from the machining program 1 is input to the numerical control apparatus 100, the command 11 is output to the machining-program reading unit 2.

The machining-program reading unit 2 reads the command 11 issued from the machining program 1, outputs the pre-compression command path 12 to the command-path storing unit 3 and the compression processing unit 4, and outputs path correction/operation data 14 to the compression processing unit 4. The path correction/operation data 14 can include information for correcting the pre-compression command path 12 instructed by the machining program 1 to a tool movement path and information necessary for determining operations during movement of the pre-compression command path 12 such as feeding speed and an operation mode of the pre-compression command path 12.

When the command-path storing unit 3 receives the pre-compression command path 12 from the machining-program reading unit 2, the command-path storing unit 3 outputs the pre-compression command path 12 to the pre-compression command path buffer 20, and stores the pre-compression command path 12 in the pre-compression command path buffer 20.

On the other hand, when the compression processing unit 4 receives the pre-compression command path 12 from the machining-program reading unit 2, the compression processing unit 4 creates new one post-compression command path 13 connecting start points and end points of a continuous plurality of pre-compression command paths 12 and outputs the post-compression command path 13 to the movement-data creating unit 5. The compression processing unit 4 also outputs the path correction/operation data 14 for the post-compression command path 13 to the movement-data creating unit 5. The compression processing unit 4 can be prevented from compressing the pre-compression command paths 12 having different path correction/operation data 14. The path correction/operation data 14 for the post-compression command path 13 may be the path correction/operation data 14 of any one of the pre-compression command paths 12 included in the post-compression command path 13.

The movement-data creating unit 5 corrects, based on the path correction/operation data 14, the post-compression command path 13 created by the compression processing unit 4 to a tool movement path, creates the tool movement data 15 necessary for interpolating the tool movement path, and outputs the tool movement data 15 to the interpolation processing unit 6.

The tool movement data 15 is data indicating a path of tool movement and an operation necessary for the interpolation. Specifically, the tool movement data 15 includes information necessary for determining operations of a machine tool concerning a tool movement path, tool movement speed, and the like such as start points and end points of axes for determining a tool position, path lengths from the start points to the end points, a unit direction vector of a tool movement path, command feeding speed, and allowable speed corresponding to the tool movement path. The movement-data creating unit 5 can output the tool movement path corrected from the post-compression command path 13 to a not-shown simulation processing unit, perform simulation processing for performing an operation check for the machining program 1 and output the tool movement path to a not-shown display device.

When the interpolation processing unit 6 receives the tool movement data 15 created by the movement-data creating unit 5, the interpolation processing unit 6 reads out the pre-compression command path 12 from the pre-compression command path buffer 20. The interpolation processing unit 6 interpolates, based on the tool movement data 15 created by the movement-data creating unit 5, the tool movement path obtained by correcting the pre-compression command path 12, and calculates the tool position 16. The interpolation processing unit 6 can drive not-shown movable units on the axes by outputting the calculated tool position 16 to a not-shown acceleration and deceleration processing unit and a not-shown servo control unit.

The operations of the numerical control apparatus according to the first embodiment are explained below.

<The Operations of the Machining-Program Reading Unit, the Command-Path Storing Unit, and the Compression Processing Unit>

First, a procedure for creating the post-compression command path 13 output from the compression processing unit 4 is explained.

Figure 2:
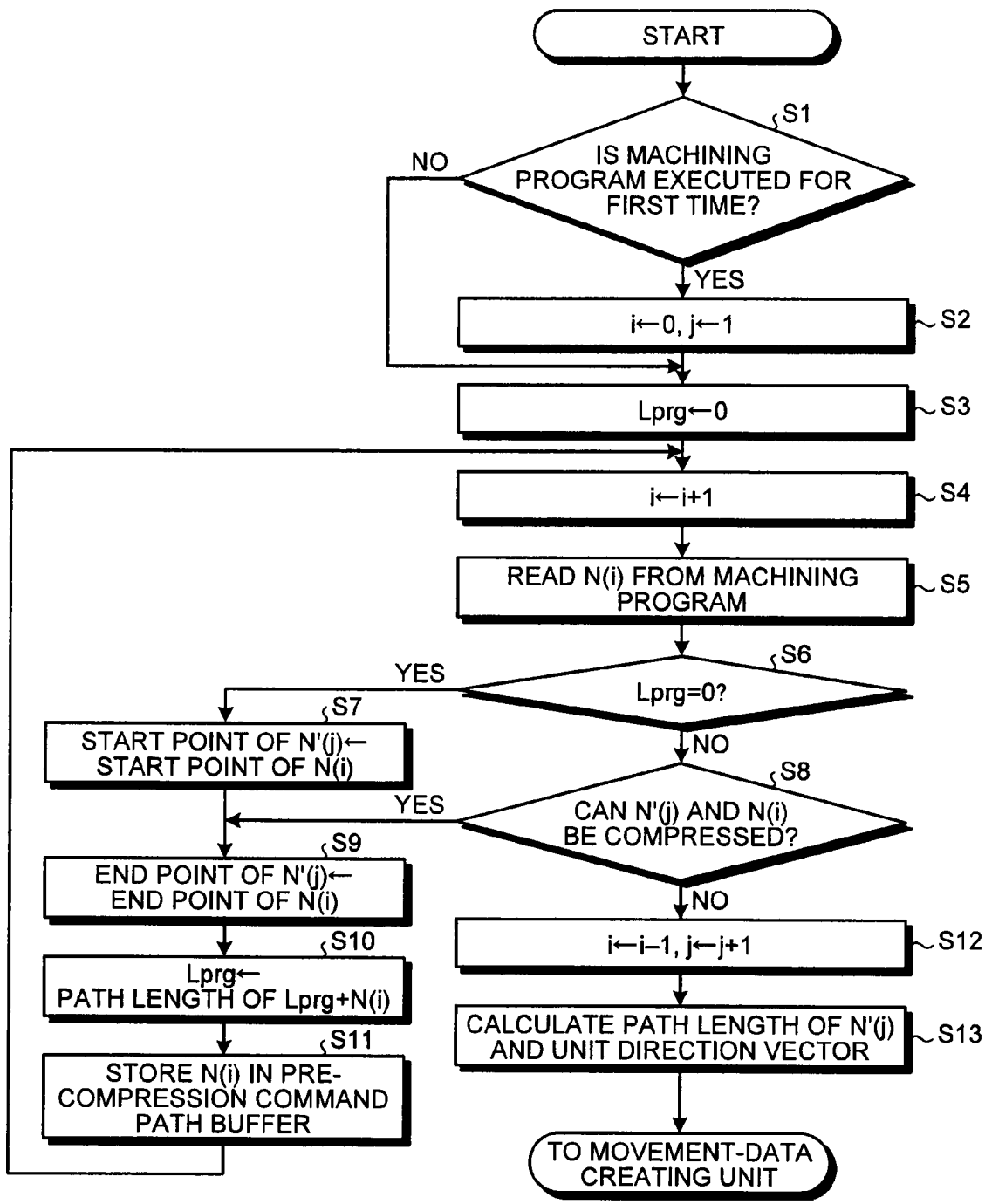
FIG. 2 is a flowchart for explaining a procedure of post-compression command path creation of the numerical control apparatus according to the first embodiment of the present invention.
Figure 3:
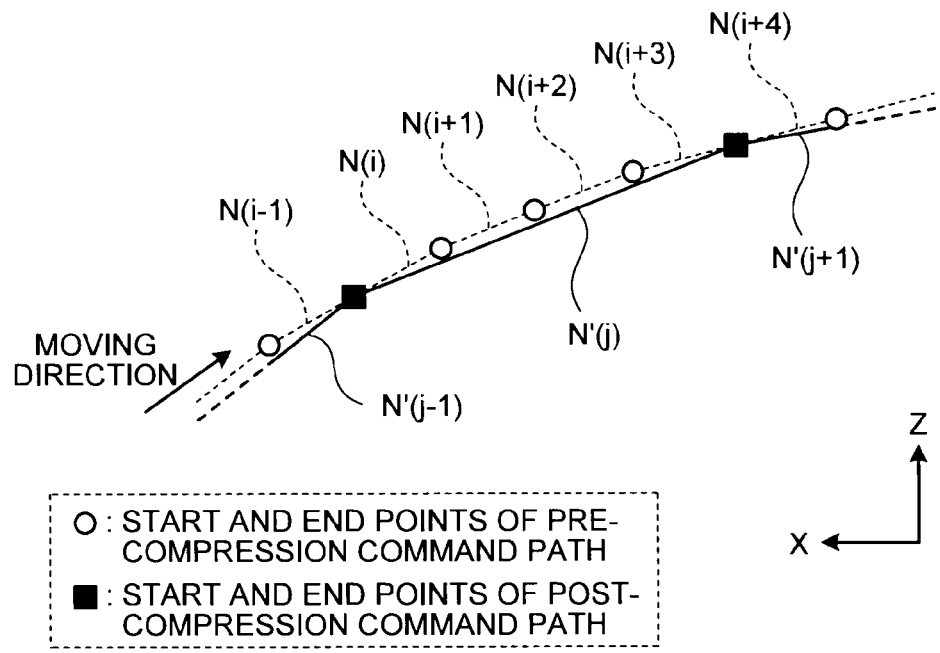
FIG. 3 is a diagram for explaining a post-compression command path in the first embodiment of the present invention.

FIG. 2 is a flowchart for explaining an example of a procedure of processing for creating the post-compression command path 13 output from the compression processing unit 4. The pre-compression command path 12 having a command path number i (an ith pre-compression command path 12 instructed by the machining program 1) is represented as N(i). A post-compression command path having a post-compression command path number j (a jth post-compression command path) obtained by compressing a plurality of pre-compression command paths N(i) is represented as N'(j'). FIG. 3 is a diagram for explaining an example of a relation between the pre-compression command path N(i) and the post-compression command path N'(j).

In FIG. 2, at step S1, the numerical control apparatus 100 determines, in the machining-program reading unit 2, whether execution of the machining program 1 is the first time. When the execution of the machining program 1 is the first time, the numerical control apparatus 100 proceeds to step S2, initializes the command path number i of the pre-compression command path N(i) with 0, initializes the post-compression command path number j of the post-compression command path N'(j) with 1, and proceeds to step S3. On the other hand, when the execution of the machining program 1 is not the first time, the numerical control apparatus 100 proceeds to step S3.

At step S3, the numerical control apparatus 100 initializes cumulative command path length Lprg. The cumulative command path length Lprg represents a cumulative value of path lengths of the pre-compression command path N(i) included in the post-compression command path N'(j).

Subsequently, at step S4, the numerical control apparatus 100 increments, in the machining-program reading unit 2, the command path number i by 1 and, at step S5, reads the pre-compression command path N(i) from the command 11 issued from the machining program 1.

Subsequently, at step S6, the numerical control apparatus 100 determines, in the compression processing unit 4, whether the cumulative command path length Lprg is 0, i.e., compression processing is performed at least once. When the cumulative command path length Lprg is 0 (the compression processing is the first time), the numerical control apparatus 100 proceeds to step S7 and sets the pre-compression command path N(i) at the start point of the post-compression command path N'(j).

On the other hand, when the cumulative command path length Lprg is not 0 (the compression processing is already performed), the numerical control apparatus 100 proceeds to step S8. Processing at step S8 is explained later. First, processing performed when the numerical control apparatus 100 proceeds to step S7 is explained below.

At step S9, the numerical control apparatus 100 sets, in the compression processing unit 4, the end point of the pre-compression command path N(i) at the end point of the post-compression command path N'(j). At step S10, the numerical control apparatus 100 adds path length of the pre-compression command path N(i) to the cumulative command path length Lprg.

Subsequently, at step S11, the numerical control apparatus 100 stores, in the command-path storing unit 3, the pre-compression command path N(i) in the pre-compression command path buffer 20 and returns to the processing by the machining-program reading unit 2 at step S4. Data stored in the pre-compression command path buffer 20 is shape data representing the pre-compression command path N(i). Specifically, the data includes the start point, the end point, and path length of the pre-compression command path N(i).

In the processing explained above, the creation of the post-compression command path N'(j) and the storage of the pre-compression command path N(i) in the pre-compression command path buffer 20 are performed. When the numerical control apparatus 100 proceeds to step S7 after the determination at step S6, the post-compression command path N'(j) and the pre-compression command path N(i) are the same command path.

A flow of processing performed after the numerical control apparatus 100 returns to step S4 is further explained below.

At step S4 to which the numerical control apparatus 100 returns from step S11, the numerical control apparatus 100 increments the command path number i by 1 and, at step S5, reads the pre-compression command path N(i) from the command 11 issued from the machining program 1. In other words, the numerical control apparatus 100 reads the next pre-compression command path N(i) of the last pre-compression command path N(i−1) read at step S5.

Subsequently, in the determination at step S6, because the path length of the last pre-compression command path N(i−1) is added to the cumulative command path length Lprg at the last step S10, the numerical control apparatus 100 proceeds to step S8.

At step S8, the numerical control apparatus 100 determines, in the compression processing unit 4, whether the post-compression command path N'(j) and the pre-compression command path N(i) can be compressed. When the post-compression command path N'(j) and the pre-compression command path N(i) can be compressed, the numerical control apparatus 100 proceeds to step S9 and overwrites the end point of the post-compression command path N'(j) with the end point of the pre-compression command path N(i). Thereafter, the numerical control apparatus 100 repeats the processing from step S10, whereby a post-compression command path obtained by compressing a plurality of pre-compression command paths is created.

On the other hand, when the post-compression command path N'(j) and the pre-compression command path N(i) cannot be compressed, the numerical control apparatus 100 ends the compression processing. At step S12, the numerical control apparatus 100 decrements the command path number i by 1 and increments the post-compression command path number j by 1.

At step S13, the numerical control apparatus 100 calculates path length Lcmp and a unit direction vector u (the unit direction vector u is a unit vector in a direction from the start point to the end point of the post-compression command path N'(j) of the created post-compression command path N'(j), sets the path length Lcmp and the unit direction vector u in the path correction/operation data 14 together with the cumulative command path length Lprg, and proceeds to the movement-data creating unit 5.

In the first embodiment, at step S12, the command path number i is decremented by 1. The pre-compression command path N(i) determined as unable to be compressed is not used thereafter. However, a read command path can be stored and, in the next step S5, the stored command path can be used rather than reading a command path from the machining program 1.

The processing for determining possibility of compression at step S8 is explained. At step S8, the numerical control apparatus 100 can determine that compression is impossible when the path correction/operation data 14 of the post-compression command path N'(j) and the pre-compression command path N(i) are different, when the post-compression command path N'(j) or the pre-compression command path N(i) is a command path in which deceleration needs to be stopped at the end point, or when the post-compression command path N'(j) or the pre-compression command path N(i) is in an operation mode for stopping deceleration at the end points of the command paths.

The command path in which deceleration needs to be stopped at the end point includes a positioning command (a G00 command) and an exact stop command (a G09 command and a G61 command). The operation mode for stopping deceleration at the end points of the command paths include a single block operation mode for executing the command paths one by one and an error detect mode for performing deceleration check at the ends of the command paths by inputting an external signal.

Besides, as a method of determining possibility of compression, the numerical control apparatus 100 may determine whether compression is possible according to whether the number of compressed paths (the number of pre-compression command paths included in a post-compression command path), whether a path error due to compression exceeds an allowable error set in advance, or whether path length of the post-compression command path exceeds allowable length set in advance.

<Operation of the Movement-Data Creating Unit>

Figure 4:
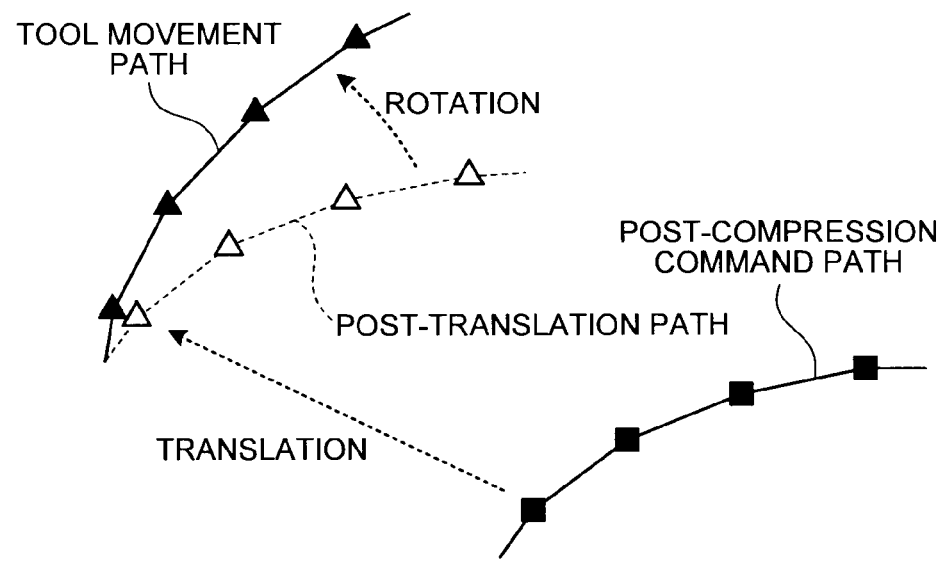
FIG. 4 is a diagram for explaining a tool movement path in the first embodiment of the present invention.

The numerical control apparatus 100 corrects, in the movement-data creating unit 5, based on the path correction/operation data 14, the post-compression command path 13 created by the compression processing unit 4 to a tool movement path. This path correction includes translation such as tool length offset and work offset, expansion and reduction of an entire command path, and coordinate conversion such as coordinate rotation. FIG. 4 is a diagram for explaining an example of a relation between the post-compression command path 13 and the tool movement path.

Subsequently, the numerical control apparatus 100 creates, in the movement-data creating unit 5, the tool movement data 15 necessary for interpolating the corrected tool movement path. In the first embodiment, path length L' of the tool movement path can be set in the tool movement data 15 as path length calculated from the cumulative command path length Lprg (a cumulative value of path lengths of the pre-compression command paths 12 included in the post-compression command path 13) of the path correction/operation data 14 rather than path length L' connecting the start point and the end point of the tool movement path. Specifically, when cumulative command path length is represented as Lprg, path length of the post-compression command path 13 is represented as Lcmp, and path length connecting the start point and the end point of the tool movement path is represented as Lt, as indicated by Formula (1), the path length L' of the tool movement path is represented as a value obtained by multiplying the cumulative command path length Lprg with a scaling factor of the path length involved in the coordinate conversion of the post-compression command path 13 (a ratio of the path length Lt connecting the start point and the end point of the tool movement path to the path length Lcmp of the post-compression command path 13).

$$L' = Lprg \times \frac{Lt}{Lcmp} \quad (1)$$

Figure 5:
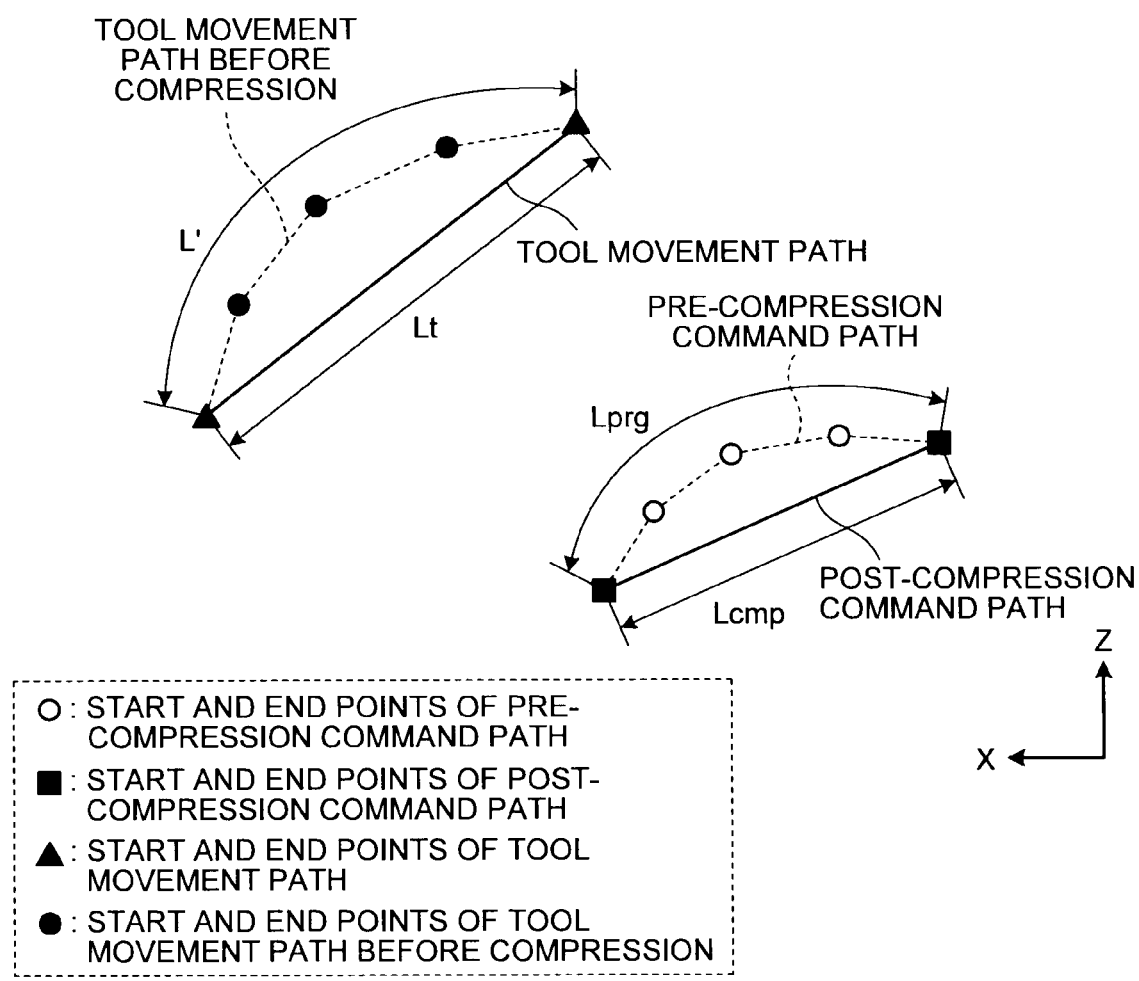
FIG. 5 is a diagram for explaining path lengths in the first embodiment of the present invention.

The calculated path length L' of the tool movement path is cumulative path length of the tool movement path obtained when the pre-compression command path 12 is not compressed by the compression processing unit 4. FIG. 5 is a diagram for explaining an example of a relation among path lengths in the first embodiment.

It is possible to reduce processing time of the movement-data creating unit 5 by creating the tool movement data 15 using the post-compression command path 13. Specifically, when the number of compressed paths (the number of pre-compression command paths 12 included in the post-compression command path 13) is represented as k, it is possible to perform the path correction and the creation of the tool movement data 15 in 1/k processing time of processing time required when the command paths are not compressed.

<Operation of the Interpolation Processing Unit>

The numerical control apparatus 100 interpolates, in the interpolation processing unit 6, a tool movement path obtained when the command paths are not compressed by the compression processing unit 4 (before compression) and creates the tool position 16 using both of the pre-compression command path 12 in the pre-compression command path buffer 20 stored by the command-path storing unit 3 and the tool movement data 15 created by the movement-data creating unit 5.

Figure 6:
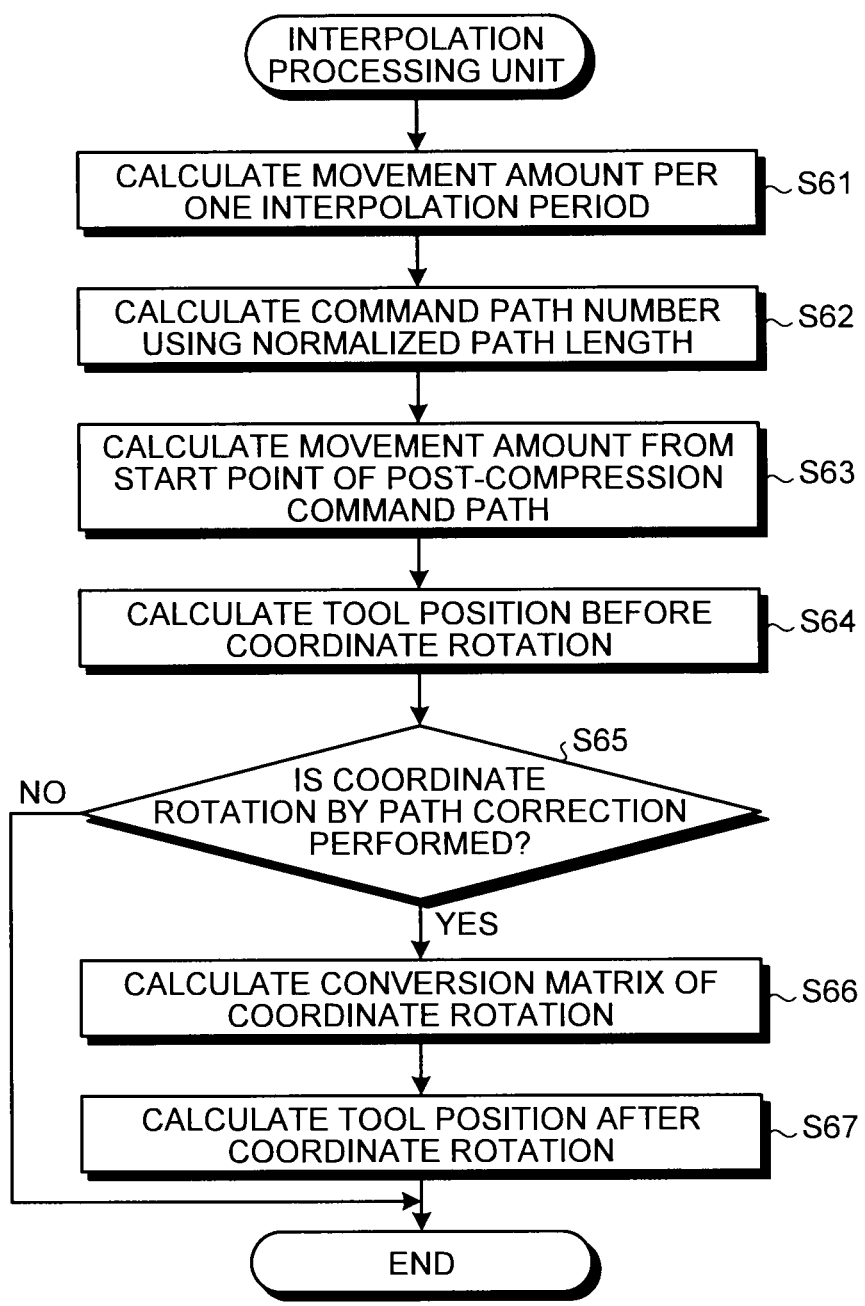
FIG. 6 is a flowchart for explaining an interpolation processing procedure of the numerical control apparatus according to the first embodiment of the present invention.

FIG. 6 is a flowchart for explaining an example of a processing procedure of the interpolation processing unit 6 in the first embodiment. In FIG. 6, at step S61, the interpolation processing unit 6 calculates a movement amount FΔT per one interpolation period from command feeding speed.

Subsequently, at step S62, the interpolation processing unit 6 normalizes the movement amount FΔT per one interpolation period with reference to the path length L' of the tool movement path and calculates a normalized movement amount FΔT'. As indicated by Formula (2), the normalized movement amount FΔT' is represented as a ratio of the movement amount FΔT per one interpolation period to the path length L' of the tool movement path.

$$F\Delta T' = \frac{F\Delta T}{L'} \quad (2)$$

Figure 7:
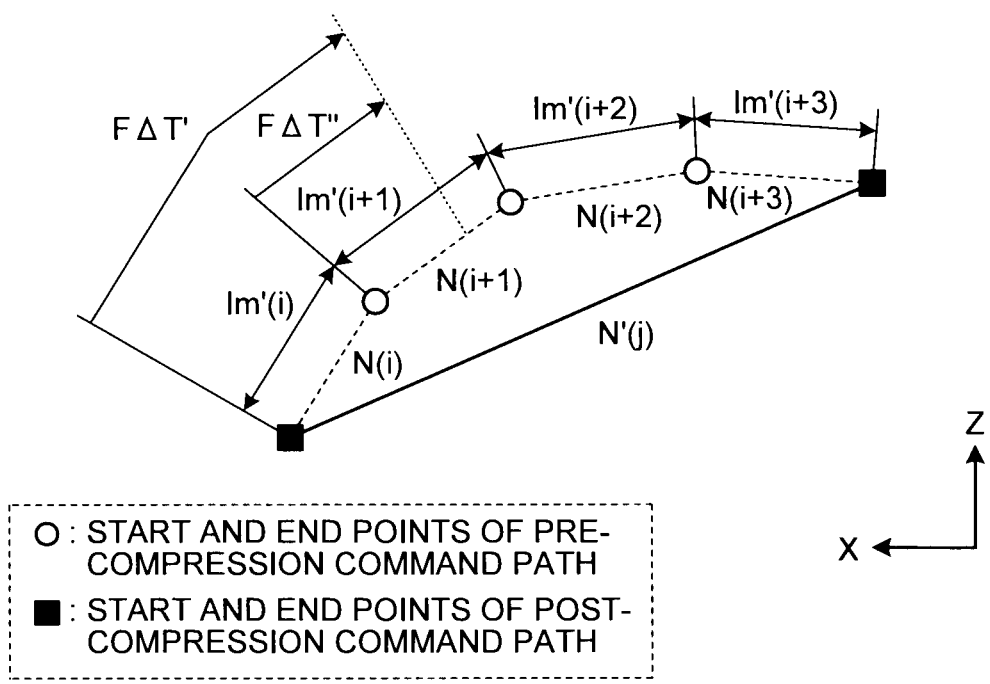
FIG. 7 is a diagram for explaining command path number calculation in the first embodiment of the present invention.

The interpolation processing unit 6 calculates a command path number using normalized path length obtained by normalizing the path length of the pre-compression command path 12 stored in the pre-compression command path buffer 20 with reference to the cumulative command path length Lprg. FIG. 7 is a diagram for explaining an example of calculation of a command path number in the first embodiment. A pre-compression command path having a command path number i (an ith pre-compression command path instructed from the machining program 1) is represented as N(i), normalized path length of the pre-compression command path N(i) is represented as lm'(i), and a jth post-compression command path obtained by compressing a plurality of pre-compression command paths N(i) is represented as N'(j). In FIG. 7, four pre-compression command paths N(i) to N(i+3) are compressed as N'(j). In FIG. 7, the cumulative command path length Lprg is represented as a sum of path lengths lm(i) of the pre-compression command paths N(i) included in the post-compression command path N'(j).

$$Lprg = \sum_{k=0}^{3} lm(i+k) \quad (3)$$

When path length of the pre-compression command path N(i) is represented as lm(i), as indicated by Formula (4), the normalized path length lm'(i) is represented as a ratio of the path length lm(i) of the pre-compression command path N(i) to the cumulative command path length Lprg.

$$lm'(i) = \frac{lm(i)}{Lprg} \quad (4)$$

A method of calculating a command path number is specifically explained with reference to FIG. 7. For simplification, it is assumed that the present tool position is at the start point of N'(j).

In FIG. 7, the interpolation processing unit 6 determines whether the normalized movement amount FΔT' is larger than the normalized path length lm'(i). When the normalized movement amount FΔT' is smaller, a calculated command path number is i (a command path number of a first pre-compression command path N(i) after the present tool position included in the post-compression command path N'(j)).

On the other hand, when normalized movement amount FΔT' is larger, the interpolation processing unit 6 performs comparison of magnitudes of a movement amount FΔT"
obtained by subtracting lm'(i) from the normalized movement
amount FΔT' and lm'(i+1).

When the movement amount FΔT" is smaller, a calculated
command path number is (i+1). By repeating the above, a
command path number is calculated. In FIG. 7, the calculated
command path number is (i+1). In the following explanation,
the calculated command path number is represented as m.

In the calculation of the example explained above, it is
assumed that the present tool position is at the start point of
the post-compression command path N'(j). However, when
the present tool position is not present in the start point of the
post-compression command path N'(j), if a command path
number of the pre-compression command path N(i) on which
the present tool position is present is represented as i and the
remaining path length of the pre-compression command path
N(i) (length along a path from the present tool position to the
end point of the pre-compression command path N(i)) is
represented as lm(i), the command path number m can be
calculated by a procedure same as the procedure explained
above. When the interpolation processing unit 6 reaches the
end of the post-compression command path N'(j), the interpolation processing unit 6 only has to proceed to the next
post-compression command path N'(j+1) and repeats the
same procedure until the remaining FΔT' decreases to 0 using
the remaining normalized movement amount FΔT' at that
point.

In the first embodiment, the calculated command path
number m in the pre-compression command path can be
output as the number of rows of a program currently being
executed and displayed on the not-shown display device.

Subsequently, at step S63, first, the interpolation processing unit 6 calculates a coordinate value pt on the pre-compression command path N(m) from a ratio of the normalized
path length lm'(m) of the pre-compression command path
N(m) and the movement amount FΔT" from the start point of
the pre-compression command path N(m). Specifically, when
a start point coordinate value of the pre-compression command path N(m) is represented as p(m−1) and an end point
coordinate value of the pre-compression command path N(m)
is represented as p(m), as indicated by Formula (5), the coordinate value pt is calculated by adding, to a start coordinate
value of the pre-compression command path N(m), a movement amount from the start point of the pre-compression
command path N(m) obtained by multiplying a movement
amount from the start point to the end point of the pre-compression command path N(m) with a ratio of the movement amount FΔT" from the start point of the pre-compression command path N(m) to the normalized path length lm'
(m) of the pre-compression command path N(m).

$$pt = p(m-1) + (p(m) - p(m-1)) \times \frac{F\Delta T''}{lm'(m)} \quad (5)$$

The interpolation processing unit 6 calculates a movement
amount Δp on axes in the post-compression command path
N'(j) by subtracting a coordinate value pt' in the present command path from the coordinate value pt.

Subsequently, at step S64, the interpolation processing unit
6 converts the movement amount Δp in the post-compression
command path N'(j) into a movement amount Δp' in the tool
movement path and adds the movement amount Δp' to a
present tool position pn to calculate a tool position p' before
coordinate rotation by path correction. Specifically, as indicated by Formula (6), the interpolation processing unit 6
calculates the movement amount Δp' by multiplying the
movement amount Δp in the post-compression command
path N'(j) with a scaling factor of path length (a ratio of the
path length Lt connecting the start point and the end point of
the tool movement path to the path length Lcmp of the post-compression command path) involved in the coordinate conversion of the post-compression command path N'(j). The
interpolation processing unit 6 calculates the tool position p'
by adding the movement amount Δp' to the present tool position pn. Consequently, expansion and reduction in the path
correction of the movement-data creating unit 5 can be
absorbed.

$$p' = pn + \Delta p \times \frac{Lt}{Lcmp} \quad (6)$$

Subsequently, at step S65, the interpolation processing unit
6 determines whether the coordinate rotation is performed in
the path correction of the movement-data creating unit 5
according to whether all components of the unit direction
vector u of the post-compression command path N'(j) and a
unit direction vector u' of the tool movement path are the
same. When the coordinate rotation is not performed (the unit
direction vectors u and u' are the same), the interpolation
processing unit 6 outputs the tool position p' before the coordinate rotation by the path correction as the tool position 16.
On the other hand, when the coordinate rotation is performed
(the unit direction vectors u and u' are different), the interpolation processing unit 6 proceeds to step S66.

At step S66, the interpolation processing unit 6 calculates
a conversion matrix T for converting the unit direction vector
u of the post-compression command path N'(j) into the unit
direction vector u' of the tool movement path. The conversion
matrix T can be calculated from an angle formed by two
vectors. For example, if a vector obtained by rotating the unit
direction vector u an angle θ around a Y axis is the unit
direction vector u', the conversion matrix T is represented by
Formula (7). The rotation in the two dimensions is explained
as an example. However, in rotation in three dimensions, if a
product of matrixes around axes is calculated as the conversion matrix T, the conversion matrix T can be treated in the
same manner.

$$T = \begin{bmatrix} \cos\theta & 0 & \sin\theta \\ 0 & 1 & 0 \\ -\sin\theta & 0 & \cos\theta \end{bmatrix} \quad (7)$$

At step S67, as indicated by Formula (8), the interpolation
processing unit 6 calculates a tool position p" after the coordinate rotation by the path correction by subjecting the tool
position p' before the coordinate rotation by the path correction to coordinate conversion with the conversion matrix T
and outputs the tool position p" as the tool position 16.

$$p''=Tp' \quad (8)$$

As explained above, the first embodiment has a characteristic in that the path length of the pre-compression command
path N(i) is normalized and represented. In general, in the
movement-data creating unit, a command path is corrected by
expansion, reduction, rotation, or the like of the command
path. By representing the path length using a ratio (normalized path length) of the path length of the pre-compression
command path N(i) to the path length (the cumulative command path length) of the post-compression command path N'(j), which is a value not depending on correction of the command path such as expansion, reduction, or rotation, it is possible to perform, without recreating a pre-compression command path created and stored before by movement data creation processing, using data of the pre-compression command path, association of the pre-compression command path with a post-compression command path (association of a position on the post-compression command path (or path length from the start point of the post-compression command path) with a position on the pre-compression command path (path length from the start point of the pre-compression command path)). It is possible to efficiently perform interpolation processing with a small computational amount.

In the first embodiment, a movement amount of axes obtained by subtracting the tool position p" from a position obtained by converting an end point coordinate value of the pre-compression command path N(m) currently being executed into an end point coordinate value on the tool movement path can be output and displayed on the not-shown display device as a residual distance of the axes of the path currently being executed.

In the first embodiment, an end point coordinate value and a start point coordinate value of the next pre-compression command path N(m+1) currently being executed can be converted into an end point coordinate value and a start point coordinate value on the tool movement path. A movement amount obtained by subtracting the start point coordinate value on the tool movement path from the end point coordinate value on the tool movement path can be output and displayed on the not-shown display device as a movement distance of the next tool movement path currently being executed.

<Effects>

As explained above, according to the first embodiment, path correction to a tool movement path and creation of tool movement data can be performed on a post-compression command path obtained by compressing a plurality of pre-compression command paths. Therefore, even when a load on path correction to a tool movement path, creation of tool movement data, and processing of interpolation processing is high, it is possible to reduce a data processing amount and increase processing speed. Therefore, it is possible to realize high-speed machining.

According to the first embodiment, it is possible to interpolate a tool movement path obtained when a pre-compression command path is not compressed and calculate a tool position using both the pre-compression command path and tool movement data of the tool movement path after compression. Therefore, it is possible to generate the tool movement data of the tool movement path after compression while making it possible to move a tool on the tool movement path obtained when the command path is not compressed. It is possible to prevent deterioration in machining accuracy due to compression while suppressing occurrence of a path error due to compression.

According to the first embodiment, when a command path is a command path in which deceleration needs to be stopped at an end point, a post-compression command path and the next pre-compression command path are not compressed. This makes it possible to set a single pre-compression command path as a post-compression command path. Therefore, it is possible to execute a machining program in which a command path in which deceleration needs to be stopped at an end of the command path and a command path in which deceleration does not need to be stopped are mixed in a continuous plurality of pre-compression command paths.

According to the first embodiment, in an operation mode for stopping deceleration at ends of command paths, the post-compression command path and the next pre-compression command path are not compressed. This makes it possible to set a single pre-compression command path as a post-compression command path. Therefore, even when the operation mode is changed according to a state of an external signal operated by an operator, it is possible to determine possibility of compression on a real time basis and perform an operation desired by the operator.

According to the first embodiment, it is possible to calculate a command path number of a tool position using a normalized movement amount obtained by normalizing a tool movement amount per one interpolation period with a cumulative path length reference of a tool movement path and a normalized path length obtained by normalizing path length of a pre-compression command path (a cumulative value of path length of a pre-compression command path included in a post-compression command path). Therefore, it is possible to compare magnitudes of a movement amount on a tool movement path having different paths and command path length before compression, calculate a command path number of a tool position, and interpolate the tool movement path obtained when the pre-compression command path is not compressed.

According to the first embodiment, it is possible to perform, using a tool movement path after compression obtained by subjecting a post-compression command path to path correction, simulation for performing an operation check of the machining program. Therefore, the number of paths processed in simulation processing decreases. It is possible to increase rendering update speed of the simulation.

Further, according to the first embodiment, it is possible to calculate, using a command path designated from the machining program, display of the number of rows of a program under execution, display of a residual distance of axes in a path under execution, and display of a moving path of axes of the next path being currently executed. Therefore, the operator can perform operation without feeling a sense of discomfort by causing the display device to display information of the original machining program itself.

Second Embodiment

Figure 8:
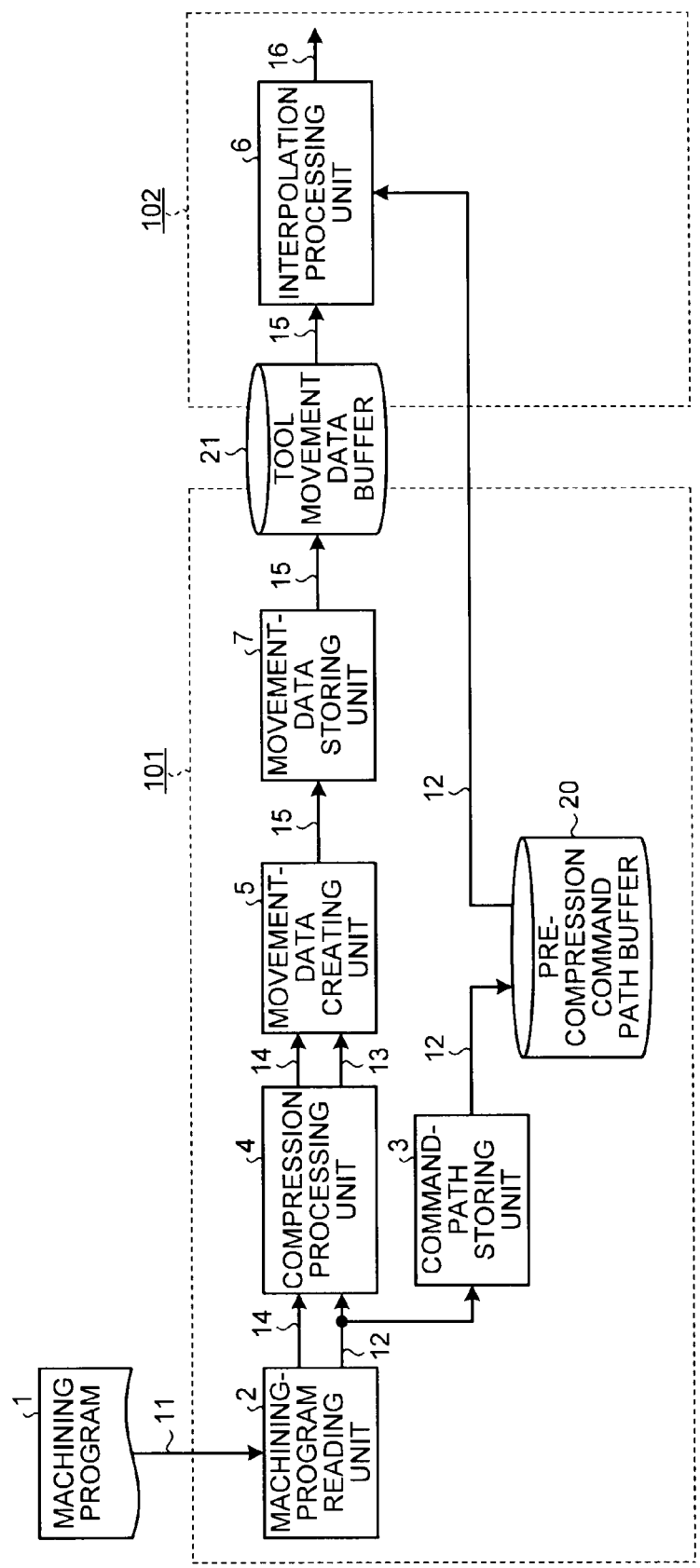
FIG. 8 is a block diagram of a schematic configuration of a production system according to a second embodiment of the present invention.

FIG. 8 is a block diagram of a schematic configuration of a second embodiment of the production system according to the present invention. In FIG. 8, a movement data calculating apparatus 101 includes a movement-data storing unit 7 that stores the tool movement data 15 output from the movement-data creating unit 5 in a tool movement data buffer 21, the machining-program reading unit 2, the command-path storing unit 3, the compression processing unit 4, and the movement-data creating unit 5. A numerical control apparatus 102 includes the interpolation processing unit 6. Components that attain functions same as those of the components of the block diagram showing the schematic diagram in the first embodiment shown in FIG. 1 are denoted by the same reference numerals and redundant explanation of the components is omitted.

The operations of the second embodiment are explained below.

In the first embodiment, all of the machining-program reading unit 2, the command-path storing unit 3, the compression processing unit 4, the movement-data creating unit 5, and the interpolation processing unit 6 in FIG. 1 are processed by the numerical control apparatus 100. On the other hand, in the second embodiment, the pre-compression command path 12 and the tool movement data 15 are stored in the pre-compression command path buffer 20 and the tool movement data buffer 21 before machining by the movement data calculating apparatus 101 including the machining-program reading unit 2, the command-path storing unit 3, the compression processing unit 4, the movement-data creating unit 5, the movement-data storing unit 7, and the tool movement data buffer 21. The numerical control apparatus 102 interpolates, in the interpolation processing unit 6, based on the tool movement data 15 stored in the tool movement data buffer 21, with real time, a tool movement path obtained by correcting the pre-compression command path 12 and calculates the tool position 16.

In the second embodiment, the pre-compression command path 12 and the tool movement data 15 are stored in the different buffers. However, as illustrated in FIG. 9, the pre-compression command path 12 and the tool movement data 15 can be stored in combination.

<Effects>

The machining-program reading unit 2, the command-path storing unit 3, the compression processing unit 4, and the movement-data creating unit 5 are processed by the movement data calculating apparatus 101. Consequently, in addition to the effects of the first embodiment, a processing load in real time of the numerical control apparatus 102 is reduced. It is possible to realize higher-speed machining without deteriorating machining accuracy.

Third Embodiment

Figure 10:
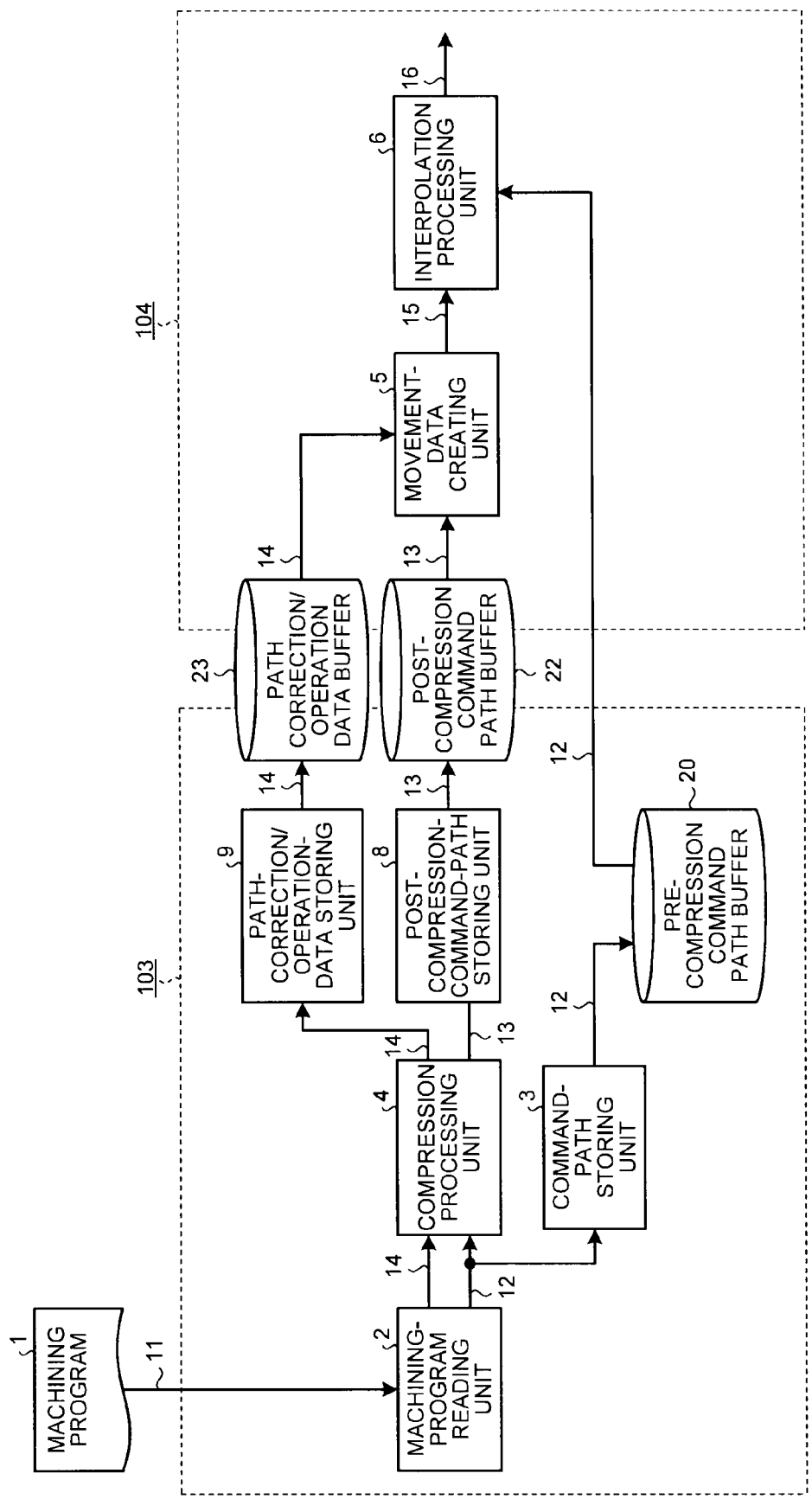
FIG. 10 is a block diagram of a schematic configuration of a production system according to a third embodiment of the present invention.

FIG. 10 is a block diagram of a schematic configuration of a third embodiment of the production system according to the present invention. In FIG. 10, a post-compression shape calculating apparatus 103 includes a post-compression-command-path storing unit 8 that stores the post-compression command path 13 output from the compression processing unit 4 in the post-compression command path buffer 22, a path-correction/operation-data storing unit 9 that stores the path correction/operation data 14 output from the compression processing unit 4 in a path correction/operation data buffer 23, the machining-program reading unit 2, the command-path storing unit 3, and the compression processing unit 4. A numerical control apparatus 104 includes the movement-data creating unit 5 and the interpolation processing unit 6. Components that attain functions same as those of the components of the block diagram showing the schematic diagram in the first embodiment shown in FIG. 1 are denoted by the same reference numerals and redundant explanation of the components is omitted.

The operations of the third embodiment are explained below.

In the second embodiment, the machining-program reading unit 2, the command-path storing unit 3, the compression processing unit 4, and the movement-data creating unit 5 in FIG. 8 are processed by the movement data calculating apparatus 101. On the other hand, in the third embodiment, the pre-compression command path 12, the post-compression command path 13, and the path correction/operation data 14 are stored in the pre-compression command path buffer 20, the post-compression command path buffer 22, and the path correction/operation data buffer 23 before machining by the post-compression shape calculating apparatus 103 including the machining-program reading unit 2, the command-path storing unit 3, the compression processing unit 4, the post-compression-command-path storing unit 8, the post-compression command path buffer 22, the path-correction/operation-data storing unit 9, and the path correction/operation data buffer 23. The numerical control apparatus 104 creates, in the movement-data creating unit 5, based on the path correction/operation data 14 stored in the path correction/operation data buffer 23, tool movement data used for correcting, with real time, the post-compression command path 13 stored in the post-compression command path buffer 22 to a tool movement path and interpolating the tool movement path, interpolates, in the interpolation processing unit 6, based on the tool movement data 15 created in the movement-data creating unit 5, with real time, a tool movement path obtained by correcting the pre-compression command path 12, and calculates a tool position.

In the third embodiment, the pre-compression command path 12, the post-compression command path 13, and the path correction/operation data 14 are stored in the different buffers. However, as shown in FIG. 11, the pre-compression command path 12, the post-compression command path 13, and the path correction/operation data 14 may be stored in combination.

<Effects>

The machining-program reading unit 2, the command-path storing unit 3, and the compression processing unit 4 are processed by the post-compression shape calculating apparatus 103. Consequently, in addition to the effects of the first embodiment, a processing load in real time of the numerical control apparatus 104 is reduced. It is possible to realize higher-speed machining without deteriorating machining accuracy. Processing by the movement-data creating unit 5 is performed in real time. Consequently, even when a tool is damaged during machining and replaced with a spare tool to perform machining, because the tool movement data 15 is calculated according to tool data after the replacement, it is possible to directly use the pre-compression command path 12, the post-compression command path 13, and the path correction/operation data 14 calculated in advance before machining.

INDUSTRIAL APPLICABILITY

As explained above, the numerical control apparatus according to the present invention can perform path correction to a tool movement path and creation of tool movement data on a post-compression command path obtained by compressing a plurality of command paths and calculate a tool position on a tool movement path obtained when the command paths are not compressed. The numerical control apparatus is suitable for a method of realizing an increase in speed of machining without deteriorating machining accuracy even when a machining program including a plurality of command paths having small path length is used.

REFERENCE SIGNS LIST 1 machining program
2 machining-program reading unit
3 command-path storing unit
4 compression processing unit
5 movement-data creating unit
6 interpolation processing unit
7 movement-data storing unit
8 post-compression-command-path storing unit
9 path-correction/operation-data storing unit
21 tool movement data buffer
22 post-compression command path buffer
23 path correction/operation data buffer
11 command
12 pre-compression command path
13 post-compression command path 14 path correction/operation data
15 tool movement data
16 tool position
20 pre-compression command path buffer
100, 102, 104 numerical control apparatuses
101 movement data calculating apparatus
103 post-compression shape calculating apparatus

The invention claimed is:

1. A numerical control apparatus, comprising:
   a compression processing unit that performs a compression processing that replaces a continuous plurality of pre-compression command paths with one post-compression command path which is one line segment connecting both end points of the continuous plurality of pre-compression command paths;
   a movement-data creating unit that corrects the post-compression command path, based on path correction/operation data for the post-compression command path, to a tool movement path, and creates tool movement data used for interpolating the tool movement path; and
   an interpolation processing unit that creates the tool movement path based on the path correction/operation data and the post-compression command path, calculates a movement amount in the continuous plurality of pre-compression command paths, interpolates, based on the tool movement data, the tool movement path obtained by correcting a pre-compression command path of the continuous plurality of pre-compression command paths, corrects the movement amount so as to move a tool on the tool movement path obtained when the continuous plurality of pre-compression command paths are not compressed based on the tool movement data created by the movement-data creating unit, and calculates a tool position.

2. The numerical control apparatus according to claim 1, further comprising:
   a machining-program reading unit that reads a pre-compression command path and the path correction/operation data from a command issued from a machining program including the continuous plurality of pre-compression command paths; and
   a command-path storing unit that stores the pre-compression command path read by the machining-program reading unit in a pre-compression command path buffer.

3. The numerical control apparatus according to claim 2, wherein the compression processing unit sets a single pre-compression command path of the continuous plurality of pre-compression command paths as a post-compression command path when deceleration needs to be stopped at an end point of the single pre-compression command path or when the single pre-compression command path is in an operation mode for stopping deceleration at end points of the continuous plurality of pre-compression command paths.

4. The numerical control apparatus according to claim 2, wherein the interpolation processing unit performs association of the tool movement path and the continuous plurality of pre-compression command paths, based on normalized movement length obtained by normalizing a tool movement amount per one interpolation period with a cumulative path length reference of a tool movement path obtained when the continuous plurality of pre-compression command paths are not compressed and normalized path length obtained by normalizing, with a cumulative command path length reference, a path length of the pre-compression command path stored in the pre-compression command path buffer.

5. The numerical control apparatus according to claim 2, wherein the numerical control apparatus performs an operation check for the machining program based on a tool movement path corrected from the post-compression command path by the movement-data creating unit.

6. The numerical control apparatus according to claim 2, wherein the numerical control apparatus performs, based on the pre-compression command path stored by the command-path storing unit, display of a number of rows of a program under execution, display of a residual distance of axes of a path under execution, and display of a movement distance of axes of a next path currently being executed.

7. A numerical control apparatus, comprising an interpolation processing unit that interpolates, based on tool movement data used for interpolating a tool movement path obtained by correcting a post-compression command path based on path correction/operation data which is one line segment connecting both end points of a continuous plurality of pre-compression command paths,
   the interpolation processing unit further interpolates a tool movement path obtained by correcting a pre-compression command path of the continuous plurality of pre-compression command paths, corrects the movement amount so as to move a tool on the tool movement path obtained when the continuous plurality of pre-compression command paths are not compressed based on the tool movement data created by the movement-data creating unit, and calculates a tool position, the post-compression command path being created by performing a compression processing that replaces the continuous plurality of pre-compression command paths with one post-compression command path, the interpolation processing unit creating the tool movement path based on the path correction/operation data and the post-compression command path.

8. A numerical control apparatus, comprising:
   a movement-data creating unit that interpolates, based on path correction/operation data for a post-compression command path which is one line segment connecting both end points of a continuous plurality of pre-compression command paths, the post-compression command path to a tool movement path and creates tool movement data used for interpolating the tool movement path, the post-compression command path being created by performing a compression processing that replaces the continuous plurality of pre-compression command paths with one post-compression command path; and
   an interpolation processing unit that creates the tool movement path based on the path correction/operation data and the post-compression command path, calculates a movement amount in the continuous plurality of pre-compression command paths, interpolates, based on tool movement data created by the movement-data creating unit, the tool movement path obtained by correcting a pre-compression command path of the continuous plurality of pre-compression command paths, corrects the movement amount so as to move a tool on the tool movement path obtained when the continuous plurality of pre-compression command paths are not compressed based on the tool movement data created by the movement-data creating unit, and calculates a tool position.

9. A production system, comprising:
   a movement data calculating apparatus; and
   a numerical control apparatus, wherein
   the movement data calculating apparatus includes:
      a compression processing unit that performs a compression processing that replaces a continuous plurality of pre-compression command paths with one post-compression command path which is one line segment connecting both end points of the continuous plurality of pre-compression command paths;

a movement-data creating unit that corrects the post-compression command path, based on path correction/operation data for the post-compression command path, to a tool movement path, and creates tool movement data used for interpolating the tool movement path; and a tool-movement-data storing unit that stores the tool movement data created by the movement-data creating unit in a tool movement data buffer, the numerical control apparatus includes an interpolation processing unit that creates the tool movement path based on the path correction/operation data and the post-compression command path, and interpolates, based on the tool movement data stored in the tool movement data buffer, the tool movement path obtained by correcting a pre-compression command path of the continuous plurality of pre-compression command paths, and calculates a tool position, and the movement data calculating apparatus stores the tool movement data in the tool movement data buffer in advance before machining.

10. The production system according to claim 9, wherein the interpolation processing unit performs association of the tool movement path and the continuous plurality of pre-compression command paths, based on normalized movement length obtained by normalizing a tool movement amount per one interpolation period with a cumulative path length reference of a tool movement path obtained when the continuous plurality of pre-compression command paths are not compressed and normalized path length obtained by normalizing, with a cumulative command path length reference, a path length of the pre-compression command path stored in the pre-compression command path buffer.

11. The production system according to claim 9, wherein the compression processing unit sets a single pre-compression command path of the continuous plurality of pre-compression command paths as a post-compression command path when deceleration needs to be stopped at an end point of the single pre-compression command path or when the single pre-compression command path is in an operation mode for stopping deceleration at end points of the continuous plurality of pre-compression command paths.

12. A production system, comprising:
a post-compression shape calculating apparatus; and
a numerical control apparatus, wherein
the post-compression shape calculating apparatus includes:
a compression processing unit that performs a compression processing that replaces a continuous plurality of pre-compression command paths with one post-compression command path which is one line segment connecting both end points of the plurality of continuous pre-compression command paths;
a post-compression-command-path storing unit that stores the post-compression command path in a post-compression command path buffer; and
a path-correction/operation-data storing unit that stores path correction/operation data for the post-compression command path created by the compression processing unit in a path correction/operation data buffer, and the numerical control apparatus includes:
a movement-data creating unit that corrects, based on the path correction/operation data, the post-compression command path to a tool movement path and creates tool movement data used for interpolating the tool movement path; and
an interpolation processing unit that interpolates, based on the tool movement data created by the movement-data creating unit, the tool movement path obtained by interpolating a pre-compression command path of the continuous plurality of pre-compression command paths, the post-compression shape calculating apparatus stores the post-compression command path and the path correction/operation data respectively in the post-compression command path buffer and the path correction/operation data buffer in advance before machining, and the numerical control apparatus creates the tool movement path based on the path correction/operation data stored in the path correction/operation data buffer and the post-compression command path stored in the post-compression command path buffer, and interpolates, based on the tool movement data, the tool movement path obtained by correcting the pre-compression command path of the continuous plurality of pre-compression command paths, and calculates a tool position.

13. The production system according to claim 12, wherein the production system performs an operation check for the machining program based on a tool movement path corrected from the post-compression command path by the movement-data creating unit.

14. The production system according to claim 12, wherein the production system performs, based on the pre-compression command path stored by the command-path storing unit, display of a number of rows of a program under execution, display of a residual distance of axes of a path under execution, and display of a movement distance of axes of a next path currently being executed.

15. The production system according to claim 12, wherein the compression processing unit sets a single pre-compression command path of the continuous plurality of pre-compression command paths as a post-compression command path when deceleration needs to be stopped at an end point of the single pre-compression command path or when the single pre-compression command path is in an operation mode for stopping deceleration at end points of the continuous plurality of pre-compression command paths.

16. The production system according to claim 12, wherein the interpolation processing unit performs association of the tool movement path and the continuous plurality of pre-compression command paths, based on normalized movement length obtained by normalizing a tool movement amount per one interpolation period with a cumulative path length reference of a tool movement path obtained when the continuous plurality of pre-compression command paths are not compressed and normalized path length obtained by normalizing, with a cumulative command path length reference, a path length of the pre-compression command path stored in the pre-compression command path buffer.

* * * * *